INVENTOR:
CARL E. JOHNSON,
BY
ATTORNEY.

Patented Nov. 1, 1927.

1,647,633

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA.

AUTOSTART MOTOR.

Application filed June 10, 1925. Serial No. 36,240.

My invention relates to induction motors and is particularly valuable when applied to squirrel-cage induction motors, and this use of my invention will be described for the purpose of illustration in the following description. Induction motors have been built for many years by a large number of different manufacturing companies, both in the United States and abroad. The principles of design are well known and the characteristics of such motors have become very thoroughly standardized.

In the use of induction motors in driving various machinery it is necessary that the current drawn from the source of supply in starting be held within certain limits on account of the effect of instantaneous large rushes of current on the voltage regulation of such sources of supply. On the small sizes of induction motors, that is to say, in motors of 5 H. P. and below, the starting current is not of great importance due to the small size of the motor and the small amount of current taken. On motors larger than 5 H. P. practically all of the companies supplying electricity insist that the starting current of any induction motors connected to their electric supply circuits be limited, and they usually insist that the proportion of the starting current to the full load current of the motor shall be reduced as the size of the motor is increased.

In ordinary practice throughout the United States the power supply companies usually require that in induction motors of more than 5 H. P. capacity, the starting current must not exceed four times the normal full load running current, and in the case of the larger motors this value must be further reduced.

Prior to my invention it had been considered impossible to design an induction motor of a capacity above 5 H. P. which could be thrown upon the line without taking starting current above the values above stated, unless certain other desirable characteristics of the motor when running were sacrificed. It has, for example been recognized that the starting current taken could be reduced provided a motor of low efficiency, poor power factor and low pull-out were allowable, but motors having such characteristics are not readily salable and no such motors are at present on the market except possibly for some very special uses. It has, therefore, been necessary to provide special devices for induction motors above 5 H. P. capacity, either incorporated in the motor or external thereto, for the purpose of holding the starting current within permissible limits.

It is an object of my invention to produce an induction motor which can be connected directly to the line without taking excessive starting current and in which the other characteristics are kept within practical limits.

It is a further object of my invention to provide an induction motor with a rotor of the squirrel-cage type, having such inherent characteristics that low starting current is obtained, in which the entire electrically conducting system of the rotor is cast in a single piece so that all of the conducting members are molecularly united.

In the standard induction motor the magnetic flux induced by the primary conductors of the stator may be divided into useful flux, which is threaded through the secondary conductors on the rotor, and leakage flux which passes between the primary and secondary conductors and is thus ineffective to produce useful torque. Previous designers have sought to keep the leakage flux as small as possible, consistent with good mechanical and electrical design.

I have found that by a suitable proportioning of an induction motor I am able to greatly reduce the current taken by the motor from the source of supply during the acceleration period. This I accomplish in part by maintaining the proportion of leakage flux to the main flux during the starting period within certain limits, and I am further able to do this without reducing the power factor, efficiency or pull-out torque of the motor while running to an objectionable degree.

By these means I am able to produce motors having capacities above 5 H. P. which can be thrown directly on the line to start without the use of external starting devices, without drawing excessive starting currents, and which are free from all moving parts, electrical contacts or other complications.

Further objects and advantages will be made evident hereinafter.

Referring to the drawing which is for illustrative purposes only,

Figure 3:
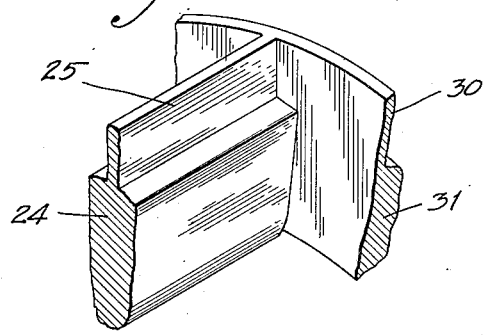
Fig. 3 is an isometric figure showing a portion of the conducting system of the rotor.

In the application of my invention to induction motors, I may utilize a rotor having the novel construction shown in the drawing, this rotor consisting of a cylindrical core 11 of material of high magnetic permeability, such as sheet steel, mounted on a shaft 12 which turns in suitable bearings 13. The core 11 rotates in a cylindrical bore 14 formed in the stator 15, which is preferably also of material of high magnetic permeability, such as sheet steel. The stator 15 is of standard construction and is provided with primary conductors or windings 16 which are so disposed that when connected to an external polyphase electric circuit, they set up a rotating magnetic field in the core 11 of the rotor. The core 11 of the rotor and the magnetic circuit of the stator are preferably made up of laminated sheets of steel secured together by any well known means, a portion of a sheet of the rotor 11 being shown at 20 in Fig. 1. Each of these sheets has openings punched therein, these openings in the different sheets being preferably assembled in alignment with each other to form a slot 21 and a slit 22, the slit 22 extending from the periphery 23 of the rotor to the slot. The punchings being properly assembled, I then place them in suitable molds and cast a conducting metal or alloy, preferably an aluminum alloy, in such a manner as to form the electrically conducting system of the rotor. This system when properly cast consists of bars 24 of relatively large cross section and low electrical resistance, each of these bars being cast integral with a similar bar 25 of relatively small cross section and high electrical resistance extending from the bar 24 into the slot 22. At each end of the core 11 I cast an end ring which may have the form shown in Figs. 2 and 3, each of these end rings consisting of a portion 30 of relatively small sectional area and a portion 31 of relatively large sectional area. The bars 25 connect directly to the portion 30 of the end rings and the bars 24 connect to the portion 31 of the end rings. It will be seen that the rotor when completed consists of a plurality of bars 24 and 25 which are arranged around the periphery of the rotor, all of the bars 24 and 25 being joined at one end to one end ring 30 or 31 and being joined at the other end to a similar end ring.

The starting current in an induction motor, and particularly the current which such a motor will draw from the line when connected directly to the line with the rotor locked so that it cannot turn, is dependent upon the impedance of the motor. This impedance may be controlled in various ways, such as by varying the resistance of the conductor bars of the rotor or by varying the magnetic conditions therein. The starting current of a standard induction motor can, therefore, be reduced by increasing the resistance of the conductor bars of the rotor. This is objectionable, since this resistance remains constant and will cause excessive heating and losses in the motor after the motor has reached its normal running speed.

Previous to my invention, it was not considered possible to vary the proportions of the magnetic circuit in such a manner as to keep the starting current within limits without so sacrificing the normal performance of the motor as to make it impractical, and it has been the practice on substantially all motors above 5 H. P. to provide external starting devices which are interposed somewhere in the motor circuit for the purpose of reducing the starting current and which is cut out of circuit when the motor is brought up to speed. It is at present standard practice in the art to furnish so-called compensators or starting devices with substantially all motors above 5 H. P. I have discovered that an induction motor can be so designed as to obtain low starting current and at the same time excellent running performance, and I have been manufacturing such motors for some time with very great commercial success. The great advantages of a motor having no electrical contacts or loose parts in the rotor and which dispenses with the compensator is apparent and my invention has come into extensive and immediate public use.

Figure 5:
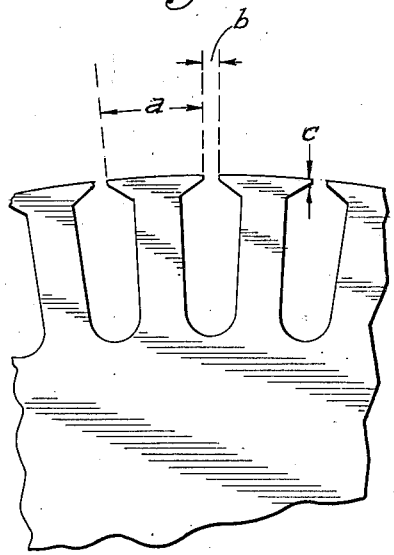
Fig. 5 is a section through a portion of a typical induction motor-rotor.
Figure 4:
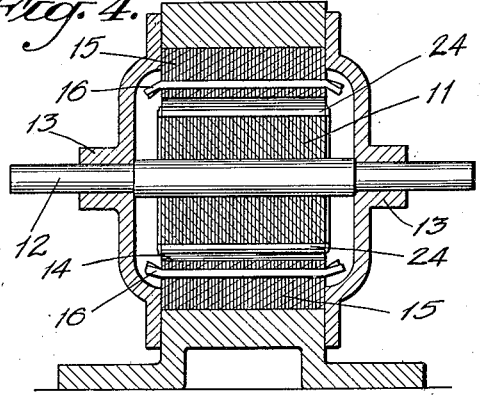
Fig. 4 is a section through an induction motor embodying my invention.

To fully understand the theory upon which my invention depends, it is necessary to consider Fig. 5, which shows what may be regarded as a typical tooth used in substantially all standard designs of induction motor-rotors as at present manufactured in this and foreign countries. This tooth is made in the peculiar shape shown for the following reasons: The dimension —a— must be kept large in relation to the dimension —b— for the purpose of obtaining a minimum reluctance in the air gap between the rotor and the stator; that is to say, it is necessary to use as much of the external surface of the rotor as possible. The dimension —c— is kept as small as possible to cut down the leakage between adjacent teeth, or, in other words, to reduce the leakage flux flowing from tooth to tooth. In the standard design of induction motors of which Fig. 5 is a fair illustration, the dimension —c— is made as small as it is possible to make it mechanically.

Figure 1:
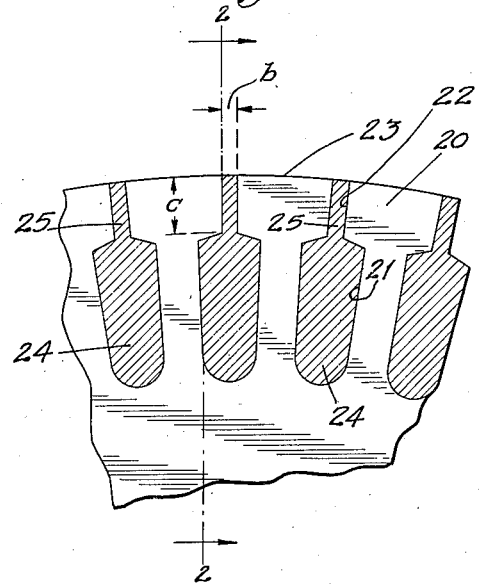
Fig. 1 is a section through a plane at right angles to the axis of the rotor, showing one of the conducting bars and a portion of the core.
Figure 2:
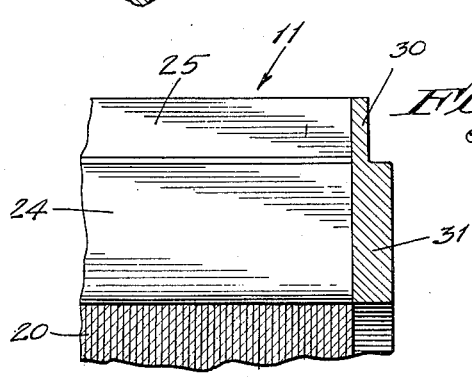
Fig. 2 is a section on a plane represented by the line 2—2 of Fig. 1.

In an induction motor embodying my invention I use the form of slot shown in Fig. 1 in which the dimension —c— is made several times as great as the dimension —b—, which dimension —b— is kept substantially the same as in the standard motor shown in Fig. 5. By maintaining the proportion of —a— to —b—, I maintain the same reluctance of the gap between the rotor and stator. By making the dimension —c— considerably greater than in the standard motor, and by casting the bars 25 in the slot 22 so produced, I am able to produce motors having a low starting current, and at the same time a good efficiency, good power factor, and high pull-out torque. For example, in a standard 10 H. P. four-pole squirrel-cage induction motor having a slot with the dimension —b— of 0.52 inches made in accordance with Fig. 5, the starting current with the rotor locked at the instant the motor is connected to the line would be approximately eight times full load current. By making the dimension —c— approximately six times that used in the standard type of motor shown in Fig. 5, and by casting the conductor 25 in this slot 22 so produced, I am able to reduce the starting current to below four times the full load current, which is well within the allowable factor for this size of motor. At the same time this particular motor, by actual test, does not have a materially lower efficiency or power factor than the standard motor, and the pull-out torque is not reduced below practical limits.

I have found that there is a definite relationship between the dimension —c— and overall diameter of the core for a given number of slots, and that motors made in accordance with my design have excellent performance characteristics if the total depth —c— is made approximately 3 per cent of the total diameter of the rotor core. In the 10 H. P. four-pole motor just considered, this value is approximately six times that used in the standard practice.

I do not wish to be understood as binding myself to any positive theory regarding my invention, but believe that the small conductors 25 play a considerable part in the successful performance obtained due probably to eddy currents set up therein at the time of starting. Since these eddy currents cannot be measured by any means known to me, I am unable to state definitely their direction or magnitude. I am certain, however, that a motor built in accordance with, and within the limits of, the above specification has the very remarkable characteristics specified.

There has been a need for many years for an alternating current motor which could be thrown directly upon the line and which would start without taking excessive starting current. Various inventors have interested themselves in the problem and have provided various mechanical devices incorporated in the motor itself, most of which are operated by centrifugal force and which change the characteristics of the motor as it approaches its normal speed. These devices are all extremely complicated, expensive and difficult to keep in order. So far as I am aware, I am the first inventor to develop an induction motor in sizes above 5 H. P. which has the proper inherent characteristics to enable it to be started directly from the line without auxiliary devices and which, after it has reached its normal operating condition, still operates with what may be termed normal characteristics. This I accomplish by a motor which is not inherently more expensive to manufacture than the standard motor, motors of my invention being free from all external starting devices or internal operating parts or complications.

I claim as my invention:

1. In an induction motor, a rotor comprising: a cylindrical core formed of material of high magnetic permeability, said core having slots formed therein adjacent to its periphery, each slot being connected to a slit extending from said slot to the periphery of said rotor; a series of conductors of relatively large cross section, each situated in one of said slots; a series of conductors of relatively small cross section and substantially parallelepipedal in form, each of said conductors of relatively small cross section being situated in one of said slits and molecularly united with the conductor of relatively large cross section in the adjacent slot; two end rings of relatively small cross section, each situated concentrically about the axis of said cylindrical core, and one being placed at one end thereof and the other being placed at the other end thereof, each being molecularly united with said conductors of relatively small cross section; and two end rings of relatively large cross section, each situated concentrically about the axis of said cylindrical core and one being placed at one end of said cylindrical core and the other being placed at the other end of said core, each being molecularly united with said bars of relatively large cross section, each of said end rings of relatively large cross section being integral with its companion end ring of relatively small cross section.

2. In an inductor motor, a rotor comprising: a cylindrical core formed of material of high magnetic permeability, said core having slots formed therein adjacent to its periphery, each slot being connected to a slit extending from said slot to the periphery of said rotor; a series of conductors of relatively large cross section, each situated in one of said slots; a series of conductors of relatively small cross section, each of said conductors of relatively small cross section being situated in one of said slits and molecularly united with the conductor of relatively large cross section in the adjacent slot; two end rings of relatively small cross section, each situated concentrically about the axis of said cylindrical core, and one being placed at one end thereof and the other being placed at the other end thereof, each being molecularly united with said conductors of relatively small cross section; and two end rings of relatively large cross section, each situated concentrically about the axis of said cylindrical core and one being placed at one end of said cylindrical core and the other being placed at the other end of said core, each being molecularly united with said bars of relatively large cross section, each of said end rings of relatively large cross section being integral with its companion end ring of relatively small cross section.

3. In an induction motor, a rotor comprising: a cylindrical core formed of material of high magnetic permeability, said core having slots formed therein adjacent to the cylindrical periphery thereof; conductor bars cast in said slots and each consisting of a main portion of comparatively large sectional area and an auxiliary portion between said main portion and said periphery, said auxiliary portion being of smaller sectional area; and end rings molecularly integral with said conductor bars, said end rings having main portions of comparatively large sectional area adjacent to said main portions of said conductor bars and having auxiliary portions of much smaller sectional area adjacent to said auxiliary portions of said conductor bars.

In testimony whereof, I have hereunto set my hand at Los Angeles, California, this 5th day of June, 1925.

CARL E. JOHNSON